March 21, 1961    F. MICHEL    2,975,630
TABLET HARDNESS TESTER
Filed Oct. 28, 1958

INVENTOR
Frank Michel
BY Connolly and Hutz
ATTORNEYS

United States Patent Office 2,975,630
Patented Mar. 21, 1961

2,975,630

TABLET HARDNESS TESTER

Frank Michel, Brooklyn, N.Y., assignor to Chas. Pfizer & Co., Inc., Brooklyn, N.Y., a corporation of Delaware Filed Oct. 28, 1958, Ser. No. 770,126

3 Claims. (Cl. 73—78)

This invention relates to a device for testing the hardness of tablets by determining the force necessary to crush them, and more particularly relates to such a device for testing the hardness of medicinal tablets formed of compressed powders.

For quite some time pharmaceutical manufacturers have controlled the quality of tablets made of compressed powders by spot checking the force required to crush tablets selected by standard sampling procedures. Up to the present, two types of testers have been principally used. One is a pneumatic device described in U.S. Letters Patent 2,645,936, and the other is a spring-operated device described in U.S. Letters Patent 2,041,869. However, none of these devices provides all of the advantages which might be desired in a convenient testing device of this sort such as compactness, portability, wide range of tablet size and shape, accommodation without adjustment, speed of operation, and accuracy maintained over a wide range of tablet sizes.

An object of this invention is to provide a simple and economical tablet hardness tester which is compact, readily portable, accommodates a wide range of tablet sizes, maintains accuracy over this wide range, requires a minimum of adjustment for accommodating tablets varying over this wide range, and is rapidly operable.

In accordance with this invention, a gauging assembly is mounted upon one jaw of a plier-like pressure-applying device, and a pivoted tablet supporting anvil is mounted upon the other jaw. This gauging assembly includes a load-transmitting rod or piston mounted within a cylindrical housing. A gauging spring reacts between the head of the cylinder and this transmitting rod. A distance-indicating gauge whose face is calibrated in units of load is mounted upon the cylinder with its indicating finger passing concentrically through the cylinder head and gauging spring into contact with the top of the transmitting rod. When a tablet is placed between the anvil and the transmitting rod and pressure is applied thereto by squeezing the handles of the pliers, the force transmitted to the tablet is readily apparent on the dial of the indicator; and the force required to crush the tablet is thereby conveniently determined. The anvil is pivoted to permit its bearing surface to conform to the outer surface of tablets over a wide range of shapes and sizes with a minimum of adjustment.

Since a standard indicator gauge is incorporated in this device, there are no complicated parts which must be specially made. Furthermore, the dial of the gauge may be accurately calibrated in load units over its entire range because it and the gauging spring are not called upon to operate until compressive force is actually applied. With this device, tablets have been tested in as little as 18 seconds whereas pre-existing devices for this same purpose require over one minute to operate.

Novel features and advantages of the present invention will become apparent to one skilled in the art from a reading of the following description in conjunction with the accompanying drawings wherein similar reference characters refer to similar parts and in which.

Figure 1:
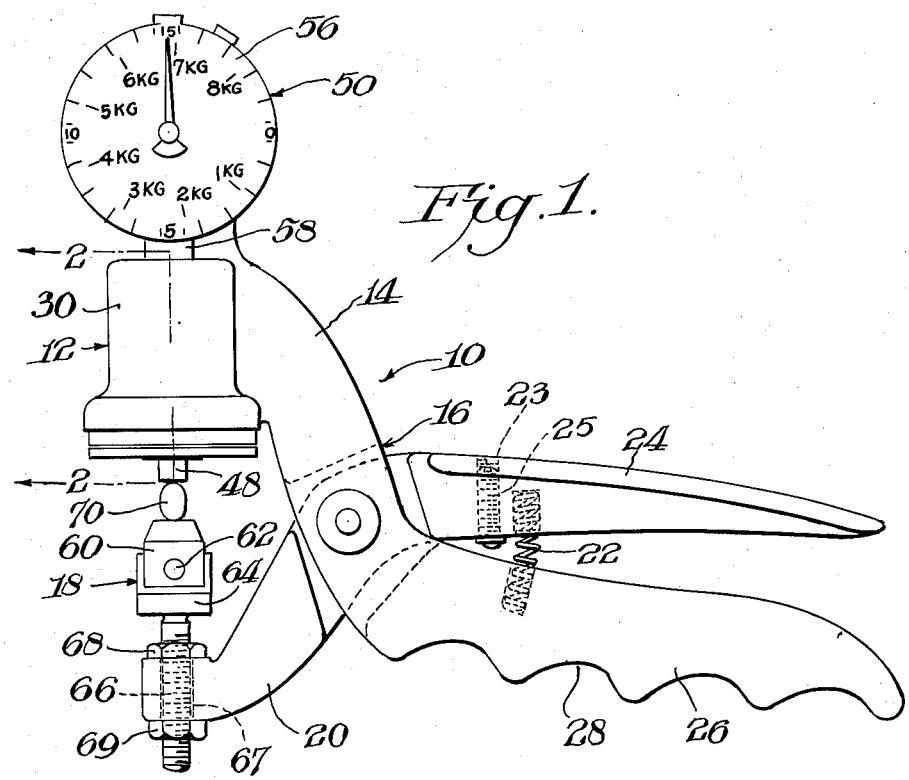
Fig. 1 is a view in elevation of one embodiment of this invention.
Figure 2:
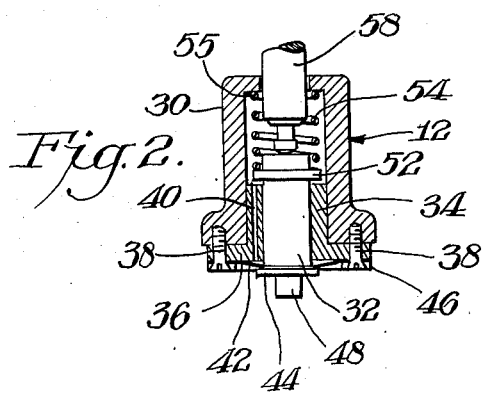
Fig. 2 is a cross-sectional view taken through Fig. 1 along the line 2—2.

In Figs. 1 and 2 is shown a tablet hardness tester 10 incorporating a gauging assembly 12 mounted upon jaw 14 of a plier-like pressure-applying device 16. A pivoted tablet-supporting anvil 18 is mounted upon the other jaw 20 of plier-like pressure-applying device 16. Resilient means 22 which is, for example, a compression spring, reacts between handles 24 and 26 of plier 16 to maintain handles 24 and 26 and jaws 14 and 20 apart until a manual squeezing pressure is applied to handles 24 and 26. Arresting means 25 which is, for example, an adjustable stop screw, is mounted in threaded passage 23 and extends from the lower surface of handle 24 to limit the approach of jaws 14 and 20, thereby protecting the instrument from shock when the tablet is crushed. The lower surface 28 of handle 26 is ridged to facilitate grasping by fingers.

Gauging assembly 12, as indicated in detail in Fig. 2, includes a cylindrical housing 30 mounted upon jaw 14. Load-transmitting rod or piston 32 is mounted within a sleeve bearing 34 attached to the bottom of cylindrical housing 30 by means of flange 36 and cap screws 38. A passageway 40 extends longitudinally through sleeve bearing 34 to permit air to circulate through cylindrical housing 30 as piston 32 moves up and down.

A flexible sealing means provided, for example, by rubber diaphragm 42 is connected to the lower end of piston 32, for example, by disposition above flange 44 formed at the lower end of piston 32, and it is secured to the flange of sleeve bearing 34 by means of a ring 46 secured by the heads of cap screws 38. Flexible seal 42 prevents dust or dirt from entering the operative portions of the device. Flange 44 also provides a positive stop to limit the travel of piston 32 thereby preventing damage to indicator 50 which is later described in detail.

Piston or rod 32 includes a lower extension 48, for example, of reduced diameter for contacting tablets and transmitting forces applied to the tablet to indicator 50. Piston 32 also includes a lateral projection 52 which is, for example, flange 52 disposed near the top of piston 32. A gauging spring 54 which is, for example, a compression spring, reacts between the inner top surface 55 of housing 30 and projection 52.

Movement indicator 50 is, for example, a standard distance indicator gauge of the sensitive type used by machinists to measure and detect movements in the neighborhood of 1/1000 of an inch. A gauge of this type is, for example, obtainable from various sources such as the Federal Indicator Gauge Company. The face 56 of gauge 50 is, for example, calibrated in units of load rather than length. A convenient arrangement is provided, for example, by marking the face in both metric and English units. Indicator sensing finger 58 of gauge 50, as shown in Fig. 2, extends concentrically through the top of housing 30 and through gauging spring 54 into contact with the top of piston 32. The movement of piston 32 against forces applied by gauging spring 54 is readily detected and is displayed upon the face of gauge 50 which is accurately calibrated to dependably indicate imposed force on gauging spring 54 over its entire range of compression. A movable indicator, not shown, may be provided in abutment with the pivoted gauge pointer to retain the maximum gauge reading attained at the instant the tablet is crushed.

Pivoting anvil 18 includes a shoe 60 which is pivoted by means of pins 62 upon a support 64 which is longitudinally adjustably mounted, for example, by a threaded shaft 66 which passes freely through smooth passage 67 in jaw 20 and is secured in position by lock nuts 68 and 69. The pivoted mounting of shoe 60 permits anvil 18 to press evenly against a wide range of size and shapes of tablets without preliminary adjustments. Tablets varying over a considerable range of sizes can accordingly be tested without re-adjusting anvil 18. Tablets varying from 7/32 to 23/64 inch in diameter can be tested without changing the position of anvil 18. However, tablets varying in size over a wider range, for example, from 3/16 of an inch to ½ inch or even more may be accommodated by the supplemental longitudinal adjustment provided by threaded shaft 66 and lock nuts 68 and 69.

*Operation*

This device may be used for testing the hardness of tablets over a considerable range of sizes and shapes with a minimum of adjustment. A tablet 70 is placed upon shoe 60 of anvil 18, preferably with the long axis of the tablet vertical, and pressure applied through handles 24 and 26 by squeezing to force tablet 70 against lower extension 48 of piston 32. The pressure is gradually increased until tablet 70 is crushed. The maximum reading displayed on face 56 of gauge 50 indicates the tablet hardness. The aforementioned operation requires as little as 18 seconds, whereas devices heretofore available have required over one minute to operate.

As indicated in detail in Fig. 2, the reading is provided by transmission of the force applied to tablet 70 through piston 32 to gauging spring 54. The movement of piston 32 is detected by indicator finger 58 of gauge 50 which contacts the top of piston 32. Since the face 56 of gauge 50 is accurately calibrated to indicate the exact force applied to spring 54 over its entire range of distortion, gauge 50 provides exact hardness readings over its entire wide range of movement.

Although this device is so compact that it may be conveniently carried in a standard pocket, it may be used to test a wide range of tablet sizes and shapes ranging from tiny pellets to larger tablets as much as ½ inch in diameter. An ordinary range of tablet size variation may be accommodated within the normal movement of pressure-applying plier 16. However, an even wider range of adjustment may be provided by varying the relative positions of threaded shaft 66 and jaw 20 in conjunction with adjustment of lock nuts 68 and 69.

What is claimed is:

1. A device for testing the hardness of tablets comprising a pair of levers pivoted in a plier form having handles and opposed jaws, a pivoted anvil for supporting a tablet mounted upon one of said jaws, a cylindrical housing mounted upon the other of said jaws in opposed relationship to said anvil, a transmitting piston movably inserted within said housing and extending a short distance outside it toward said anvil, a gauging spring mounted within said housing and reacting between said transmitting piston and said housing in a direction forcing said piston out of said housing, a distance-indicating gauge calibrated in load units having a sensing finger mounted upon said housing, and said sensing finger passing through said housing into contact with said piston to permit said gauge to provide a continuous indication of the load applied to a tablet being squeezed between said anvil and said piston.

2. A device as set forth in claim 1 wherein said piston is mounted within a flanged sleeve inserted within said housing, an air passage extending through said sleeve, and a flexible diaphragm being attached to the flange of said sleeve and to a lower portion of said piston to seal said housing.

3. A device as set forth in claim 2 wherein said spring is a cylindrical compression spring, and said sensing finger passes concentrically through said spring and said housing.

References Cited in the file of this patent

UNITED STATES PATENTS

| 1,209,350 | Steiner | Dec. 19, 1916 |
| 1,544,332 | Mance | June 30, 1925 |
| 1,903,524 | Webster | Apr. 11, 1933 |

FOREIGN PATENTS

| 437,133 | Germany | Nov. 15, 1926 |